(12) United States Patent
Overhultz (10) Patent No.: US 7,423,516 B2
(45) Date of Patent: Sep. 9, 2008

(54) SYSTEMS AND METHODS FOR APPROXIMATING THE LOCATION OF AN RFID TAG

(75) Inventor: Gary L. Overhultz, River Forest, IL (US)

(73) Assignee: Goliath Solutions, LLC, Deerfield, IL (US)

( * ) Notice: Subject to any disclaimer, the term of this patent is extended or adjusted under 35 U.S.C. 154(b) by 316 days.

(21) Appl. No.: 11/418,319

(22) Filed: May 4, 2006

(65) Prior Publication Data

US 2007/0257795 A1 Nov. 8, 2007

(51) Int. Cl.
*H04Q 5/22* (2006.01)

(52) U.S. Cl. .................. 340/10.5; 340/572.1; 340/10.1; 340/539.21

(58) Field of Classification Search .................. 340/505, 340/572.1, 10.1, 539.21
See application file for complete search history.

(56) References Cited

U.S. PATENT DOCUMENTS

| | | | |
|---|---|---|---|
| 5,168,263 A | 12/1992 | Drucker | |
| 5,201,060 A | 4/1993 | Haruyama et al. | |
| 5,235,326 A | 8/1993 | Beigel et al. | |
| 5,583,850 A | 12/1996 | Snodgrass et al. | |
| 5,640,683 A | 6/1997 | Evans et al. | |
| 5,774,876 A | 6/1998 | Woolley et al. | |
| 5,776,278 A | 7/1998 | Tuttle et al. | |
| 5,894,266 A | 4/1999 | Wood, Jr. et al. | |
| 5,910,776 A | 6/1999 | Black | |
| 5,920,261 A | 7/1999 | Hughes et al. | |
| 5,936,527 A | 8/1999 | Isaacman et al. | |
| 5,949,335 A | 9/1999 | Maynard | |
| 6,951,305 B2 | 10/2005 | Overhultz et al. | |
| 7,021,535 B2 | 4/2006 | Overhultz et al. | |
| 2004/0183682 A1* | 9/2004 | Tenarvitz | 340/573.1 |
| 2006/0170565 A1* | 8/2006 | Husak et al. | 340/825.49 |

\* cited by examiner

*Primary Examiner*—George A Bugg
*Assistant Examiner*—Travis R Hunnings
(74) *Attorney, Agent, or Firm*—Jones Day (57) ABSTRACT

In accordance with the teachings described herein, systems and methods are provided for approximating the location of an RFID tag in an RFID system. The RFID system may include a plurality of receivers that receive RF signals from the RFID tag. Tag read count data for two or more of the plurality of receivers may be used to identify a number of times that each of the two or more receivers has received an RF signal from the RFID tag over a period of time. Signal strength data may be used to identify the strength of the RF signals received from the RFID tag. A combination metric for each of the two or more receivers may be determined as a function of the tag read count data and the signal strength data. The combination metrics may be compared to identify one of the receivers that is closest in proximity to the RFID tag.

27 Claims, 10 Drawing Sheets

| READ DATA | | | |
|---|---|---|---|
| TAG # | TRANSMITTED | RECEIVED | RSSI |
| 1 | 1 | 3 | 85 |
| 1 | 2 | 3 | 65 |
| 1 | 3 | 3 | 45 |
| 1 | 1 | 2 | 60 |
| 1 | 1 | 3 | 90 |

| COMBINATION METRIC PROCESSING | | | | |
|---|---|---|---|---|
| | READ COUNT (RC) | MAX RSSI | RC × RSSI | NORMALIZATION |
| RX1 | 0 | 0 | 0 | 0 |
| RX2 | 1 | 60 | 60 | 0.17 |
| RX3 | 4 | 90 | 360 | 1.00 |

| READ DATA | | | |
|---|---|---|---|
| TAG # | TRANSMITTED | RECEIVED | RSSI |
| 3 | 2 | 6 | 30 |
| 3 | 2 | 7 | 25 |
| 3 | 2 | 5 | 63 |
| 3 | 2 | 4 | 60 |
| 3 | 1 | 8 | 50 |
| 3 | 2 | 5 | 73 |
| 3 | 3 | 8 | 67 |
| 3 | 2 | 5 | 48 |
| 3 | 1 | 2 | 75 |
| 3 | 2 | 5 | 70 |
| 3 | 3 | 8 | 48 |
| 3 | 3 | 5 | 51 |
| 3 | 1 | 8 | 40 |
| 3 | 1 | 5 | 62 |
| 3 | 2 | 8 | 38 |

| COMBINATION METRIC PROCESSING | | | | |
|---|---|---|---|---|
| | READ COUNT (RC) | MAX RSSI | RC × RSSI | NORMALIZATION |
| RX2 | 1 | 75 | 75 | 0.17 |
| RX4 | 1 | 60 | 60 | 0.14 |
| RX5 | 6 | 73 | 438 | 1.00 |
| RX6 | 1 | 30 | 30 | 0.07 |
| RX7 | 1 | 25 | 25 | 0.06 |
| RX8 | 5 | 67 | 335 | 0.76 |

| TRANSMITTER COMBINATION METRIC PROCESSING | | | | |
|---|---|---|---|---|
| | READ COUNT (RC) | MAX RSSI | RC × RSSI | SUM TX1-TX3 |
| TX1/RX5 | 1 | 62 | 62 | |
| TX2/RX5 | 4 | 73 | 292 | |
| TX3/RX5 | 1 | 51 | 51 | 405 |
| | | | | |
| TX1/RX8 | 2 | 50 | 100 | |
| TX2/RX8 | 1 | 38 | 38 | |
| TX3/RX8 | 2 | 67 | 134 | 272 |

Fig. 14

SYSTEMS AND METHODS FOR APPROXIMATING THE LOCATION OF AN RFID TAG

FIELD

The technology described in this patent document relates generally to radio frequency identification (RFID) systems. More particularly, the patent document describes systems and methods for approximating a location of an RFID tag in an RFID system. The technology described herein is particularly useful in the systems disclosed in commonly owned U.S. Pat. Nos. 6,837,427, 6,951,305, 7,021,535 and PCT. Patent Application No. PCT/US05/37138, filed Oct. 18, 2005, the subject matter of which is incorporated herein by reference.

BACKGROUND AND SUMMARY

RFID systems are known that can receive signals from RFID tags using a plurality of receivers located throughout a facility, as shown in the aforesaid U.S. Patents. With improvements to the sensitivity of such systems, a signal from a given RFID tag may be received by multiple receivers. Receiver sensitivity is advantageous because it improves the likelihood that every RFID tag in the facility will be identified. However, when an RFID tag signal is received by more than one receiver, it becomes more difficult to determine the location of the RFID tag within the facility with any precision.

In accordance with the teachings described herein, systems and methods are provided for approximating the location of an RFID tag in an RFID system. The RFID system may include a plurality of receivers that receive RF signals from the RFID tag. Tag read count data for two or more of the plurality of receivers may be used to identify a number of times that each of the two or more receivers has received an RF signal from the RFID tag over a period of time. Signal strength data may be used to identify the strength of the RF signals received from the RFID tag. A combination metric for each of the two or more receivers may be determined as a function of the tag read count data and the signal strength data. The combination metrics may be compared to identify one of the receivers that is closest in proximity to the RFID tag.

DETAILED DESCRIPTION

Figure 1:
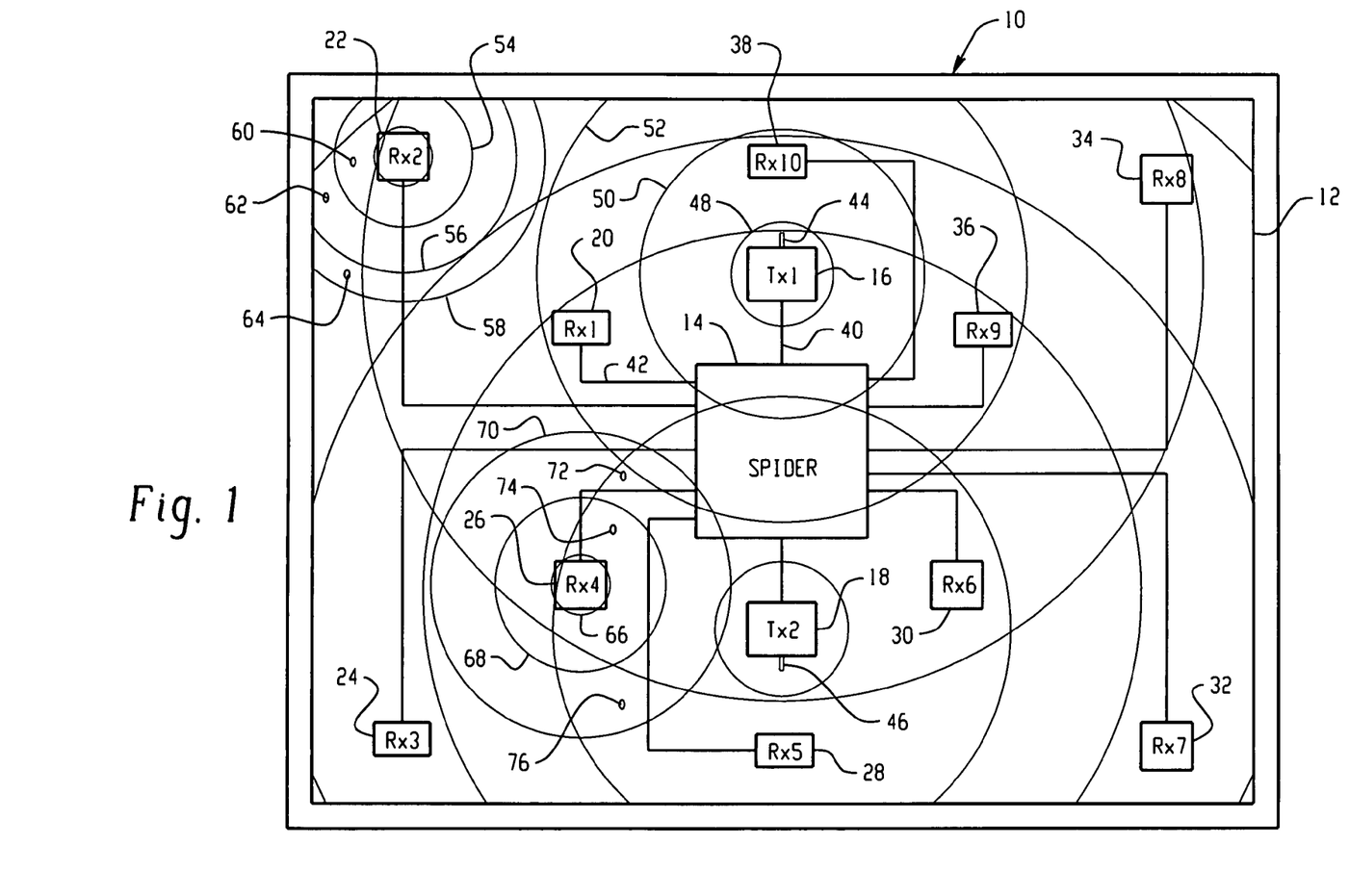
FIG. 1 depicts an example RFID system that includes a BRT hub that covers a designated area such as an entire commercial sales facility.

FIG. 1 depicts an example RFID system that includes a backscatter reader/transmitter (BRT) hub (called a "Spider") that covers a designated area of a facility. Such a system is disclosed in commonly assigned PCT Patent Application PCT/US05/37138, the disclosure of which is incorporated herein by reference. The RFID system may, for example, be used to detect and report the presence and location of radio frequency (RF) tags across selected zones in a retail environment. The RFID system may also be used to centralize RF transmission and receiving functions to reduce the expense of recurring components. A single BRT hub ("Spider") may be used that includes antennas attached to multiple transmit and receive ports to cover a designated area of a facility. In small facilities, a single BRT hub may be used to cover the entire facility as the designated area. The Spider may, for example, be connected to AC power to eliminate the cost and maintenance of batteries, as well as allowing more read cycles, if desired. This also may permit higher wattage to be used in the transmit function, potentially increasing the size and reliability of detection zones.

In FIG. 1, a small facility 10 is shown in which the designated area 12 to be covered by a BRT hub 14 includes the entire facility. The BRT hub 14 is coupled to a plurality of transmitters (TX 1, 2) 16-18 and a plurality of receivers (RX 1-10) 20-38, for example using coaxial cable. The plurality of receivers 20-38 are positioned to provide coverage of the entire designated area 12 (the entire facility 10). Preferably, only one TX and one RX are active at a time. It will be noted that RX 22 is able to receive data from RFID tags 60, 62, and 64 at different distances in the sub-area covered by RX 22, as illustrated by concentric circles 54, 56, and 58. Also it will be noted that the transmitter TX 16 has concentric rings 48, 50, and 52 that illustrate the transmitter-to-tag zones covered by the range of transmitter TX 16, thus showing that the transmitting antenna TX 16 is positioned to illuminate at least a portion of the RFID tags (in the RX zones covered by RX 20, 22, 26, 30, 34, 36, and 38) in the designated area. In like manner, TX 18 shows corresponding concentric rings illustrating illumination coverage ranges and representing transmitter-to-tag zones covering at least a portion of the RFID tags. Between the two transmitters TX 16 and 18, all of the RFID tags in the designated area (the facility 12) are capable of illumination.

Each of the transmitters TX 16 and 18 is coupled to the BRT hub 14, for example with coaxial cable. In like manner, each of the receiver antennas in each sub-area is coupled to the BRT hub 14, for example using coaxial cable. Of course, wireless connections, or other well-known types of connections could be used instead of coaxial cable.

When the transmitting antenna 16 illuminates RFID tags within its range, one of the RF signal receiving antennas, such as RX 22, receives the modulated tag signals and conveys them to the BRT hub 14 over coaxial cable (such as 42) for transmission to a remote server. A modulated RFID tag signal may be received by more than one RX antenna when read sequentially (for example RX 26 and RX 28). In such cases, the BRT hub (Spider 14) may forward both RX events to the server, and may ascertain a location within a store using closest zone readings, received signal strength indicator (RSSI) readings, antenna intersection, or other algorithms of those disclosed herein.

The transmitting antennas 44 and 46 associated with respective transmitters TX 16 and 18 and the antennas associated with the receivers (RX1-10) should be omni-directional in order to cover a large area. A shaped beam with low gain on axis and a high gain to the sides is ideal. For example, a quadrifiler helix antenna may be used for the transmitting antennas 44 and 46 and a single turn helix antenna may be used for the receivers (RX1-10). Quadrifiler helix antennas have been the choice in orbiting spacecraft communications for years. A quadrifiler helix antenna has circular polarization and a shaped beam for high gain when the spacecraft is farthest away on the earth's horizon, and low gain when the spacecraft is closest or overhead. Also, when used in an RFID system as described herein, the low profile of an quadrifiler antenna is equally advantageous. To a consumer or other observer in the facility, a quadrifiler helix antenna will typically look like a small white paper towel tube that hangs down a few inches vertically from the ceiling; alternatively it may be concealed.

Figure 5:
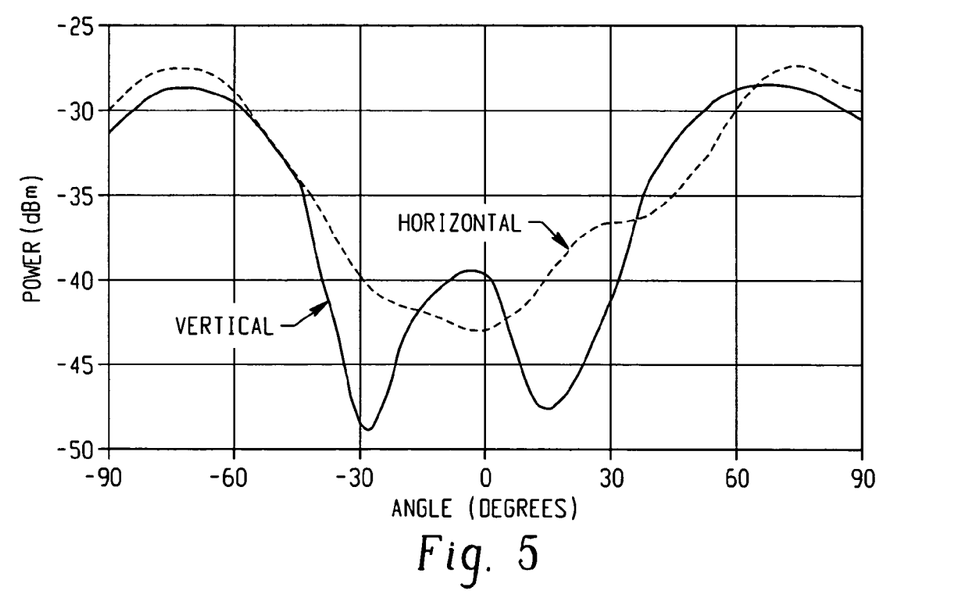
FIG. 5 is a graph illustrating example quadrifiler helix antenna gain patterns to show that the antenna has a low gain on the axis and a high gain on the sides.

Typically, the transmit beam gain from TX 16 to RX 38 would be lower than the transmit beam gain from TX 16 to RX 22. Quadrifiler helix antennas are range compensating. The gain of the antenna is higher for objects farther away, which compensates for free-space power loss due to distance. This is illustrated in FIG. 5 which shows power vs. antenna angle. Higher power levels (gain) at 70 degrees are offset by the bore sight of the antenna.

Further, quadrifiler helix antennas are typically inexpensive. The antennas 44 and 46 shown in FIG. 1, for example, may be constructed of PVC piping, #12 copper wire, and a small circuit card to maintain proper phasing between the elements. This type of antenna has been experimentally tested in a retail environment with very successful results. A preferred version is disclosed in detail in copending application Ser. No. ______, entitled "Distributed RFID Antenna Array Utilizing Circular Polarized Helical Antennas," filed of even date herewith and commonly assigned.

Under FCC rules, part 15, a conducted RF output power of 1 Watt is allowed. The BRT's that are used in the system disclosed in commonly assigned U.S. Patent Application Publication No. 2004/0056091 are battery powered and have a maximum output power of 200 mW to conserve battery life while "illuminating" tags (e.g., reflect and receive backscatter modulated signals produced by the tags). Increasing conducted transmitter power will illuminate tags in a larger area and better illuminate tags marginally located in existing zones. The use of the quadrifiler helix antenna enables a gain of approximately 6 dbic translating into an effective isotropic radiated power (EIRP) of +36 dBm or 4 W. This is an increase of approximately 9 dB over the BRT patch antenna disclosed in the above identified published and commonly assigned co-pending PCT patent application. This translates into an increase of 8 times the power.

The performance of an RF reader may be affected by transmitter power being coupled into the BRT receiver through the receiver antenna. The backscattered signal from the RFID tag is extremely small, and its detection can easily be overwhelmed by the backscatter transmitter carrier wave signal. Therefore, the separation of the TX antenna and the RX antenna, as shown in FIG. 1, improves performance because the deployment system allows for excellent separation.

Figure 6:
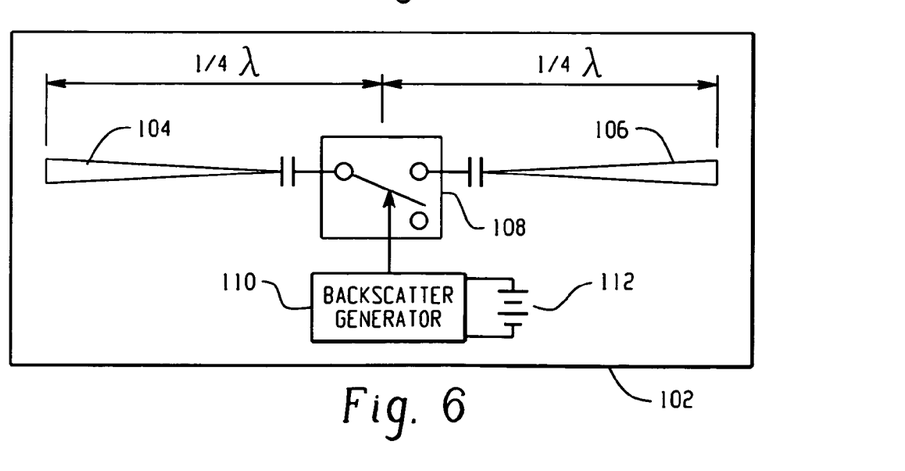
FIG. 6 depicts an example switched backscatter tag (SBT) illustrating the manner in which the switch is opened and closed to accept or reject a BRT carrier signal.

Also, the use of the switched backscatter RFID tag (SBT) 102 shown in FIG. 6 also improves the signal communications between the SBT and the BRT. In one example, the SBT 102 has an antenna in which each side 104 and 106 of the antenna is approximately ¼λ (i.e., ¼ wavelength). In the case of a 915 MHz tag, each side is about 3.2 inches long. For a 2.45 GHz tag, these lengths are be approximately 1.2 inches long. Thus, for different frequencies the antenna lengths would also be different. A backscatter generator 110 produces a sub-carrier frequency that contains data, such as a tag ID. This backscatter signal opens and closes the RF switch 108 that connects the resonant ¼λ antenna elements 104 and 106. When the switch 108 is in the closed position, the antenna acts as a ½λ element, which is not a good receiver, and that reflects a higher percentage of the reader carrier frequency back to the reader.

When the switch 108 is in the open position, as shown, each antenna side is ¼ of the wavelength of the carrier frequency, which makes it a good receiver, and therefore absorbs more of the reader carrier frequency so it is not reflected back to the reader. This combination results in a substantial increase in the ratio of a "mark" (a 1 in binary state monitoring) to "space" (a 0 in binary state monitoring) signal received by the BRT. The increased ratio results in a dramatic improvement in the reader's ability to track the modulated signal containing the tag data across much larger distances. It also allows tags to be read more easily under marginal conditions, such as when they are close to liquid or metal (conditions well known in the art to be quite challenging for tags in the UHF band). In one example, the tag has improved performance because the antenna is T-shaped, with the antenna elements across the top of the tag, pointing out and away from other circuitry on the printed circuit board. This increases the effectiveness of the available frequency aperture and reduces antenna de-tuning.

The clean switching between "on" and "off" of a resonant aperture increases the mark-to-space ratio of the backscatter data as received by the BRT. It is this increased ratio that improves the BRT's ability to detect tags in a specific area of the store area being monitored using a carrier frequency, thereby allowing tags with a cleanly-switched resonant aperture to be detected at a much greater distance than tags without a cleanly-switched resonant aperture.

The system shown in FIG. 1 is well-suited for a small commercial sales establishment, such as a drug store, but a single Spider would likely be insufficient for larger-format retailers, such as grocery or mass merchandiser outlets. In such cases, several Spiders, each with separate Webs, could be used to cover the establishment. Connectivity to phone lines and redundant external communication electronics across multiple Spiders in a store could be circumvented by centralizing those functions into one master hub 88. Such a system is shown in FIG. 2.

Figure 2:
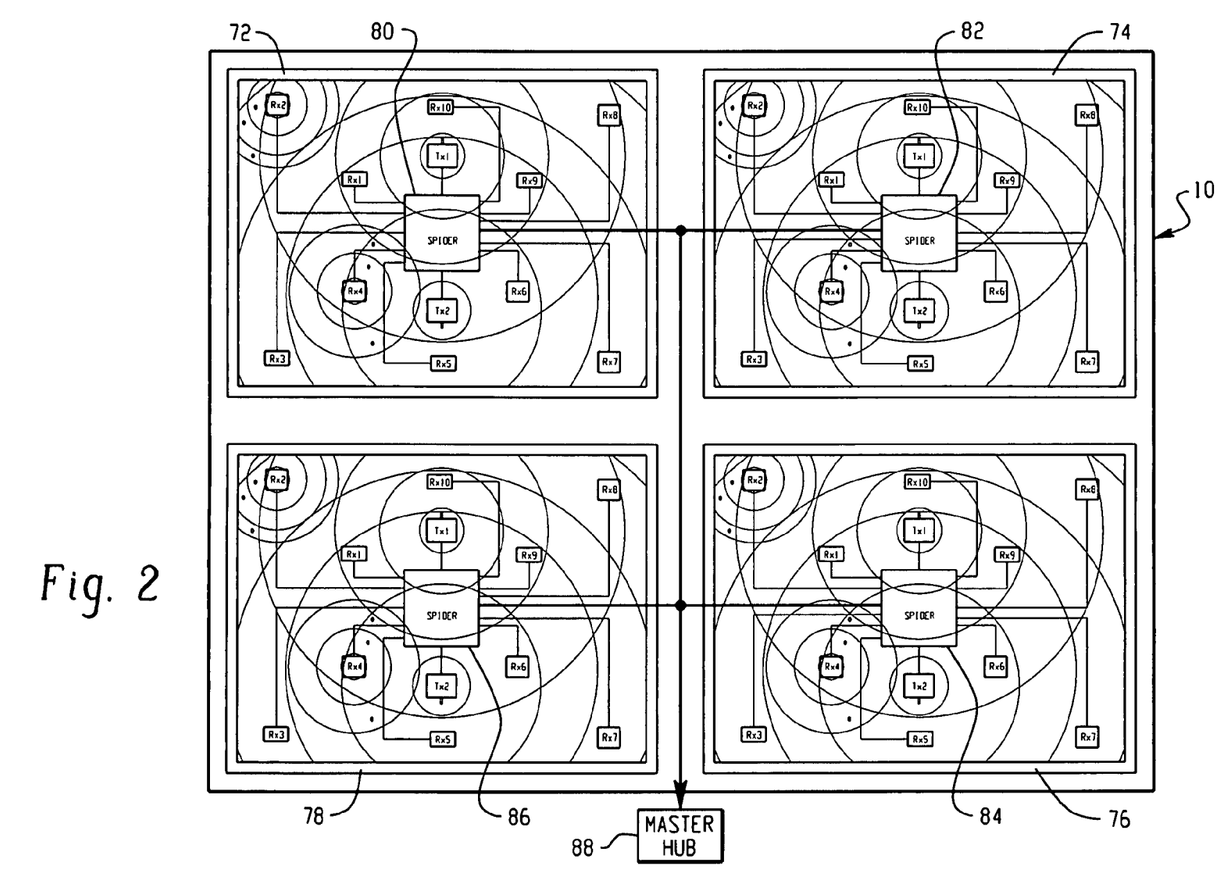
FIG. 2 depicts an example RFID system that includes a plurality of BRT hubs that are used in a plurality of designated areas to cover a larger facility.

Note in FIG. 2 that the selected location, or retail sales facility 10, is too large for one Spider. Therefore, in this example, four designated areas 72, 74, 76, and 78 are used to cover the entire facility 10. Each of the systems in each of the designated areas 72-78 is identical to the system shown in FIG. 1 and operates in an identical manner as described above. However, each of the Spiders 80, 82, 84, and 86 could be electronically coupled to a master hub 88 as shown.

Multiple Web antennae are connected to a single backscatter transmitter/receiver in the Spider, for example through coaxial cables. These coaxial cables pass through a switch matrix. This matrix and the long coaxial cables combine to create additional attenuation, thereby lowering the received signal level. To overcome this loss, a low noise amplifier (LNA) is positioned at each RX antenna. These amplifiers draw small amount of current (≈15 mA) through the coaxial cable using bias tees. Locations in retail environments that are difficult or expensive to monitor via coaxial cable, such as external fuel pump signage, could still be served by the previously-designed BRT's with distributed reader/transmitter electronics by forwarding their data wirelessly to the master Spider.

Figure 3:
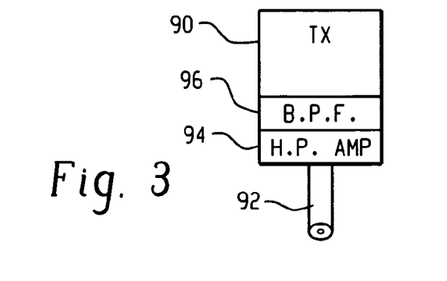
FIG. 3 depicts an example RF transmitter with a high power amplifier and a band-pass filter.

FIG. 3 is a block diagram of an example quadrifiler helix antenna 90. The antenna 90 is coupled to the Spider through a coaxial cable 92 and has an associated high power amplifier 94 to recover coaxial cable signal attenuation. The antenna 90 also has an associated ISM (Industrial, Scientific, and Medical) band pass filter 96 to reduce noise or harmonics.

Figure 4:
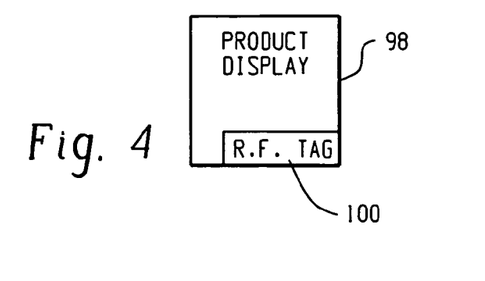
FIG. 4 depicts an object having an RFID tag associated therewith.

FIG. 4 depicts an example object 98 having an RFID tag 100 associated therewith. The object may be a permanent display, Point of Purchase (POP) temporary display, signage, advertising material, stock-alert sensors, merchandising material, category section marker, individual product, or other material desired to be monitored by retailers, manufacturers, or point-of-sale producers (collectively referred to herein as a "display.") The object may also be a consumer (or movable object) to which an RFID tag is associated so that the shopping (movement) pattern of the consumer can be monitored. In this manner, consumer exposure to a given display may be tracked. An RFID tag given to a consumer may, for example, be a small active transmitter tag (ATT) that uses the same frequency and protocol as the reflection from the semi-passive backscatter tags.

Figure 7:
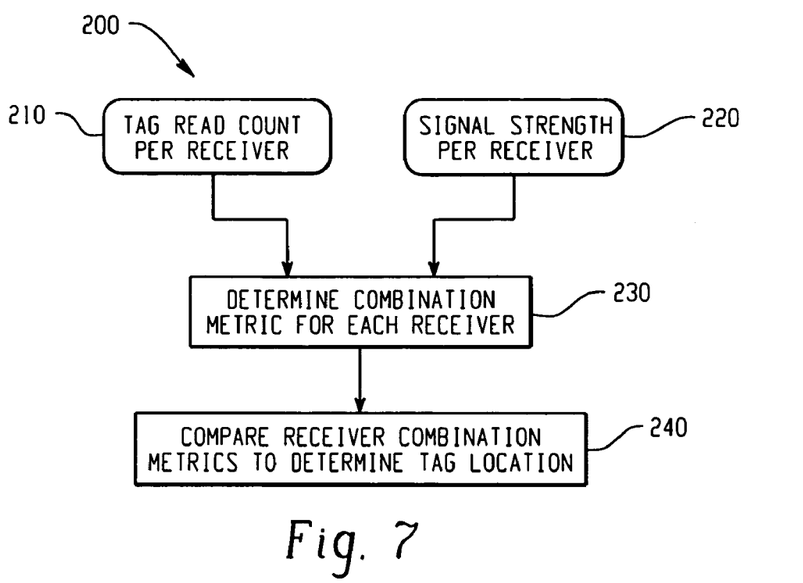
FIGS. 7-11 depict example methods for approximating a location of an RFID tag in an RFID system.

FIG. 7 depicts an example method 200 for approximating a location of an RFID tag in an RFID system having a plurality of receivers. In step 210, tag read count data is received for two or more receivers in the RFID system. The tag read count data identifies the number of times that each of the receivers has received an RF signal from the RFID tag over a given period of time. In step 220, signal strength data is received relating to the RF signals received from the RFID tags. The signal strength data preferably includes received signal strength indicator (RSSI) data, but could include other types of data for measuring the strength of a received signal.

In step 230, a combination metric is determined for each of the two or more receivers. The combination metric is determined as a function of the tag read count data and the signal strength data. For example, the combination metric may be determined by multiplying a tag read count value by a maximum RSSI value for each receiver. Then, the combination metrics are compared in step 240 to identify one of the receivers that is closest in proximity to the RFID tag. For example, the receiver having the highest combination metric may be identified as the closest to the RFID tag. In this manner, the location of the RFID tag within a facility may be approximated based on the location of the identified receiver.

Figure 8:
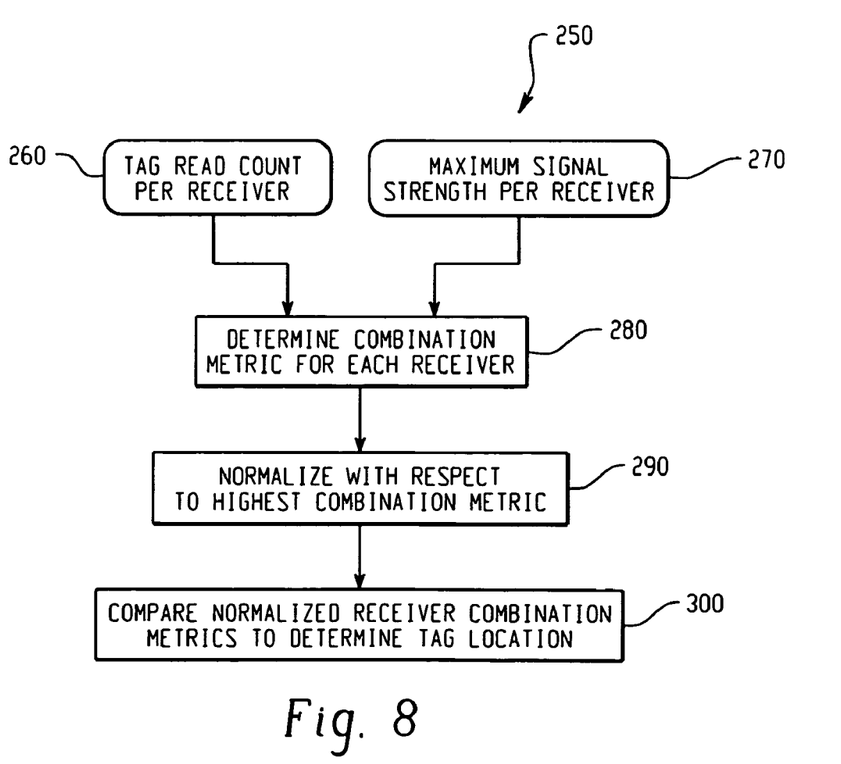

FIG. 8 depicts another example method 250 for approximating the location of an RFID tag in an RFID system. Tag read count data is received for two or more receivers in step 260, and a maximum signal strength value is identified for each receiver in step 270. In step 280, a combination metric is determined for each of the two or more receivers as a function of the tag read count data and the maximum signal strength values. For example, the combination metric may be determined by multiplying a tag read count value by a maximum RSSI value for each receiver. The combination metrics are then normalized with respect to the highest combination metric, in step 290. For example, each of the combination metrics may be divided by the highest combination metric to generated normalized values. The normalized combination metrics are compared in step 300 to identify one of the receivers that is closest in proximity to the RFID tag. For example, the receiver having the highest normalized value may be selected.

Figure 9:
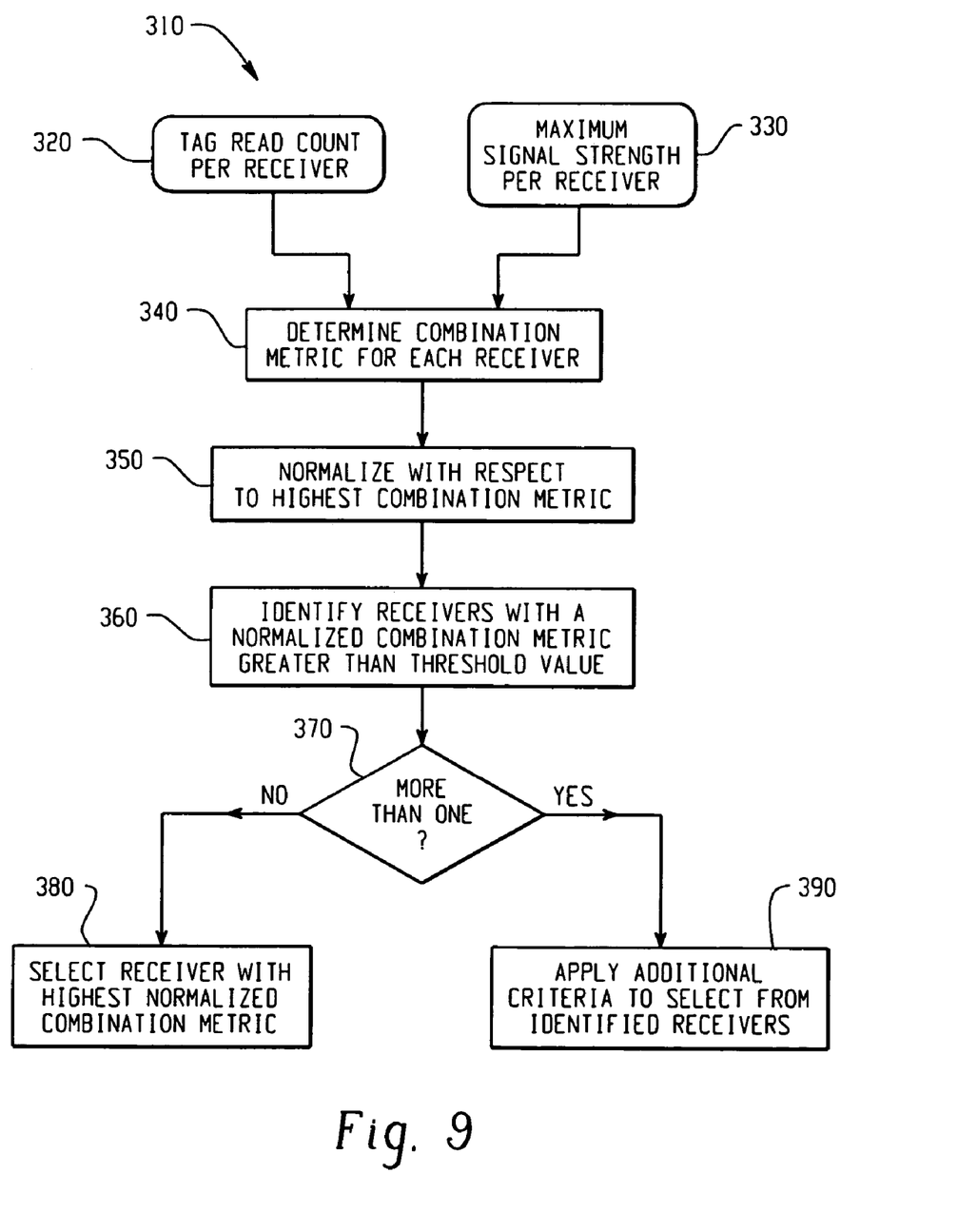

FIG. 9 depicts another method 310 for approximating the location of an RFID tag in an RFID system. Tag read count data is received for two or more receivers in step 320, and a maximum signal strength value is identified for each receiver in step 330. In step 340, a combination metric is determined for each of the two or more receivers as a function of the tag read count data and the maximum signal strength values. The combination metrics are then normalized with respect to the highest combination metric in step 350.

In step 360, the normalized combination metrics are compared with a threshold value, and one or more receivers are identified that have a combination metric that is higher than the threshold. In one example, the threshold value may be 0.75, however other threshold values could also be used. If only one receiver has a normalized combination metric above the threshold (step 370), then the receiver with the highest normalized combination metric is selected in step 380 as the receiver that is closest in proximity to the RFID tag. If more than one receiver has a normalized combination metric above the threshold, then additional criteria may be used to identify the receiver that is closest in proximity to the RFID tag in step 390.

Figure 10:
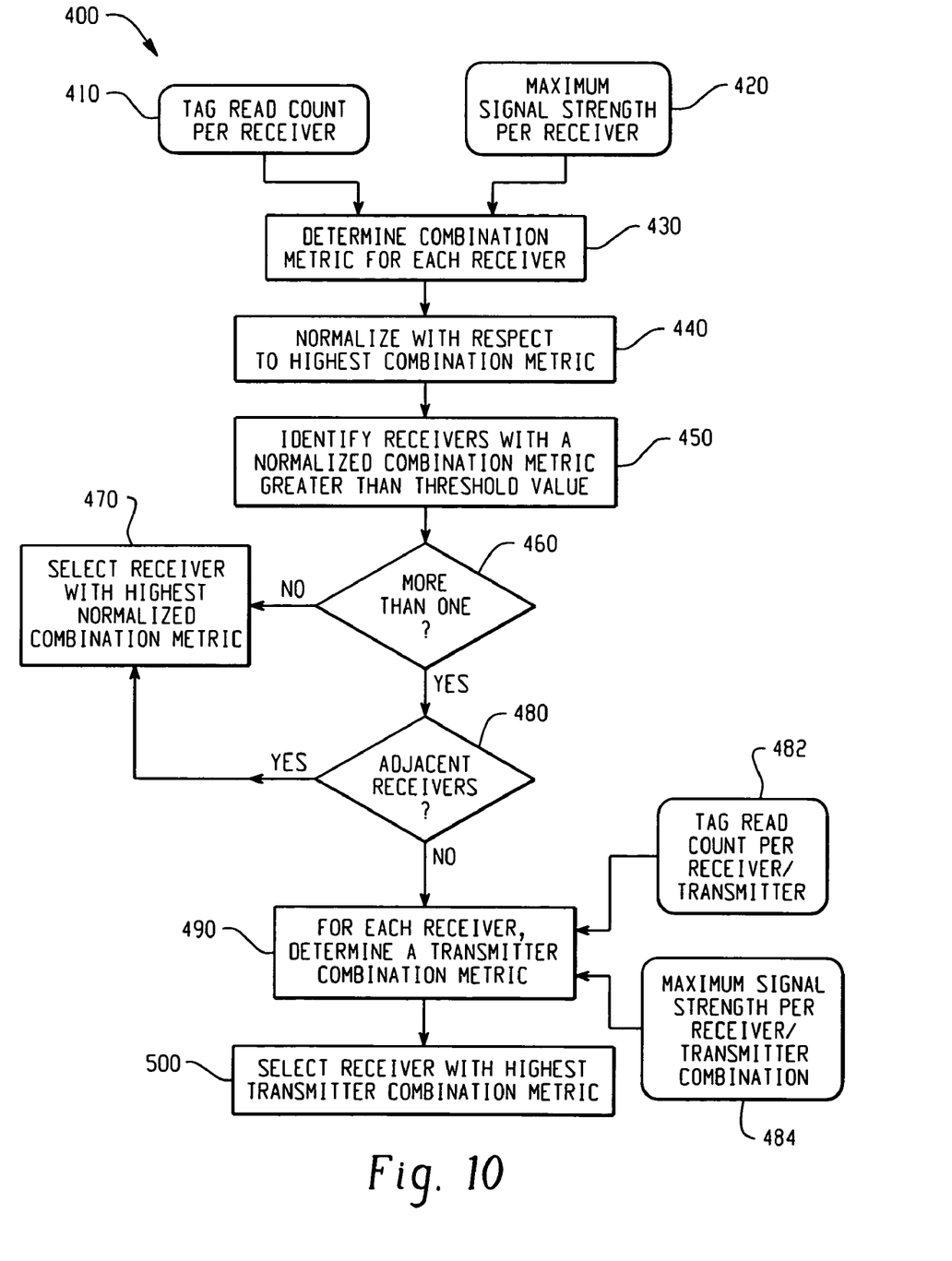

FIG. 10 depicts another method 400 for approximating the location of an RFID tag in an RFID system. Tag read count data is received for two or more receivers in step 410, and a maximum signal strength value is identified for each receiver in step 420. In step 430, a combination metric is determined for each of the two or more receivers as a function of the tag read count data and the maximum signal strength values. The combination metrics are then normalized with respect to the highest combination metric in step 440.

In step 450, the normalized combination metrics are compared with a threshold value, and one or more receivers are identified that have a combination metric that is higher than the threshold. In one example, the threshold value may be 0.75, however other threshold values could also be used. If only one receiver has a normalized combination metric above the threshold (step 460), then the receiver with the highest normalized combination metric is selected in step 470 as the receiver that is closest in proximity to the RFID tag. If more than one receiver has a normalized combination metric above the threshold, then the method examines the position in the RFID system of the receivers with the normalized combination metric above the threshold in step 480. If the receivers are adjacent in the RFID system, then the receiver with the highest normalized combination metric is selected in step 470. Otherwise, the method proceeds to step 490.

In step 490, a transmitter combination metric is determined for each of the receivers identified in step 450. The transmitter combination metrics are determined as a function of a tag read count (step 482) and a maximum signal strength value (step 484) for each receiver/transmitter combination. The transmitter combination metrics may, for example, be determined by multiplying the read count by the maximum signal strength value for each receiver/transmitter combination and then summing the resultant values, as described in more detail below with reference to FIG. 14. In step 500, the receiver with the highest transmitter combination metric is selected as the receiver that is closest in proximity to the RFID tag.

Figure 11:
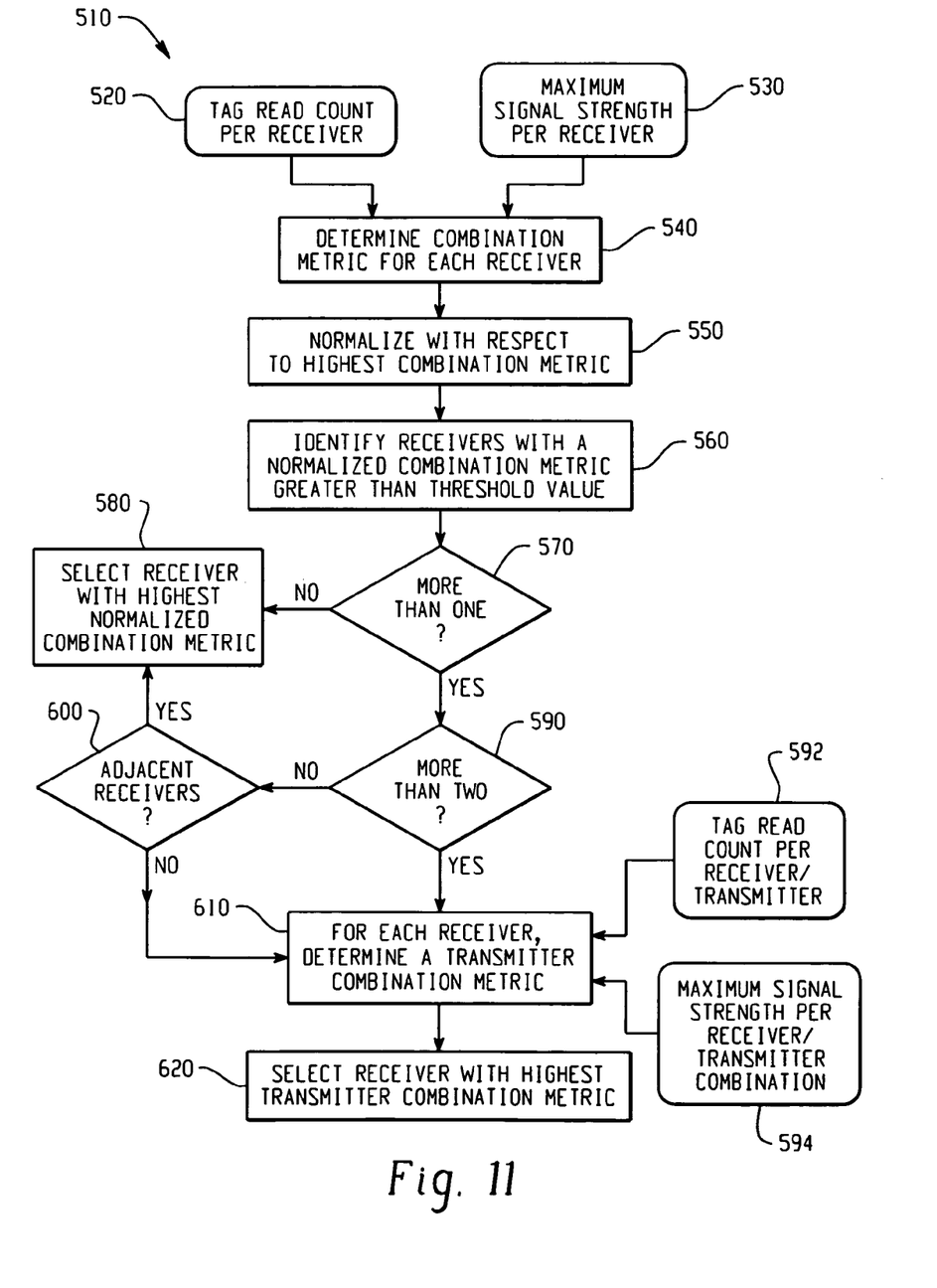

FIG. 11 depicts another method 510 for approximating the location of an RFID tag in an RFID system. Tag read count data is received for two or more receivers in step 520, and a maximum signal strength value is identified for each receiver in step 530. In step 540, a combination metric is determined for each of the two or more receivers as a function of the tag read count data and the maximum signal strength values. The combination metrics are then normalized with respect to the highest combination metric in step 550.

In step 560, the normalized combination metrics are compared with a threshold value, and one or more receivers are identified that have a combination metric that is higher than the threshold. In one example, the threshold value may be 0.75, however other threshold values could also be used. If only one receiver has a normalized combination metric above the threshold (step 570), then the receiver with the highest normalized combination metric is selected in step 580 as the receiver that is closest in proximity to the RFID tag. If two receivers have a normalized combination metric above the threshold (step 590), then the method proceeds to step 600. Otherwise, if more than two receivers have a normalized combination metric above the threshold (step 590), then the method proceeds to step 610.

In step 600, the method examines the position in the RFID system of the two receivers with the normalized combination metric above the threshold. If the two receivers are adjacent in the RFID system, then the receiver with the highest normalized combination metric is selected in step 580. Otherwise, the method proceeds to step 610.

In step 610 a transmitter combination metric is determined for each of the receivers identified in step 560. The transmitter combination metrics are determined as a function of a tag read count (step 592) and a maximum signal strength value (step 594) for each receiver/transmitter combination. The transmitter combination metrics may, for example, be determined by multiplying the read count by the maximum signal strength value for each receiver/transmitter combination and then summing the resultant values, as described in more detail below with reference to FIG. 14. In step 620, the receiver with the highest transmitter combination metric is selected as the receiver that is closest in proximity to the RFID tag.

Figure 12:
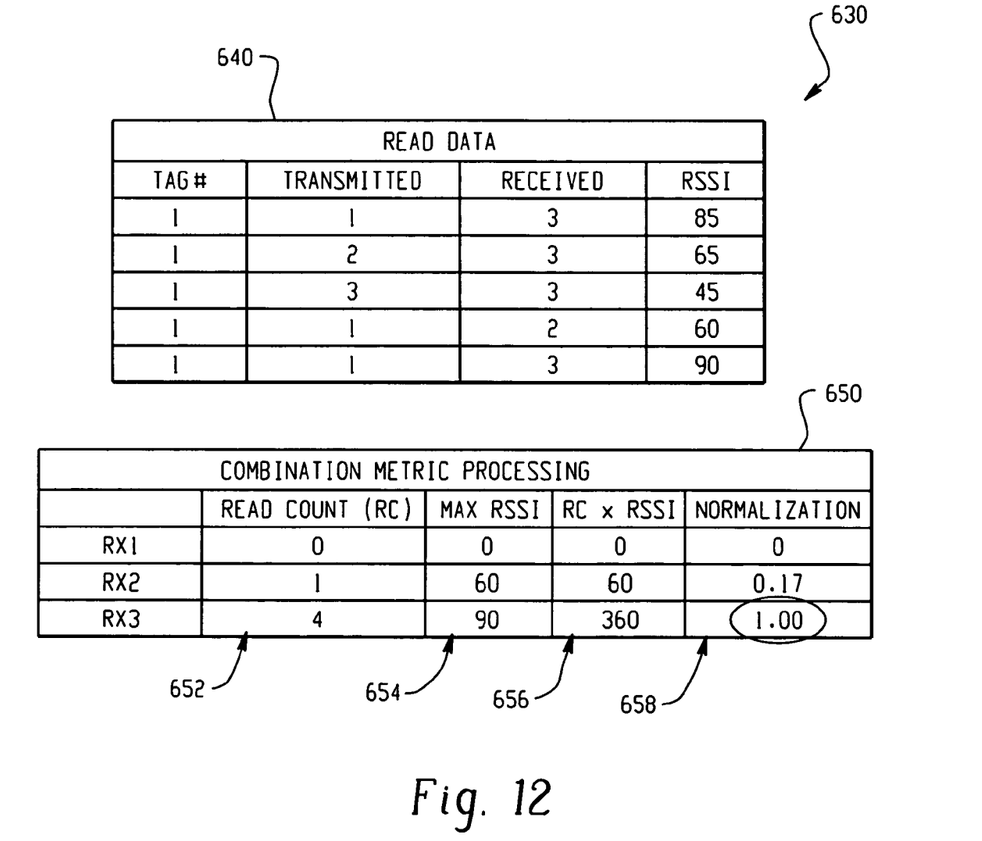
FIGS. 12-14 illustrate examples of how the location of an RFID tag may be approximated using one or more of the methods described herein.
Figure 13:
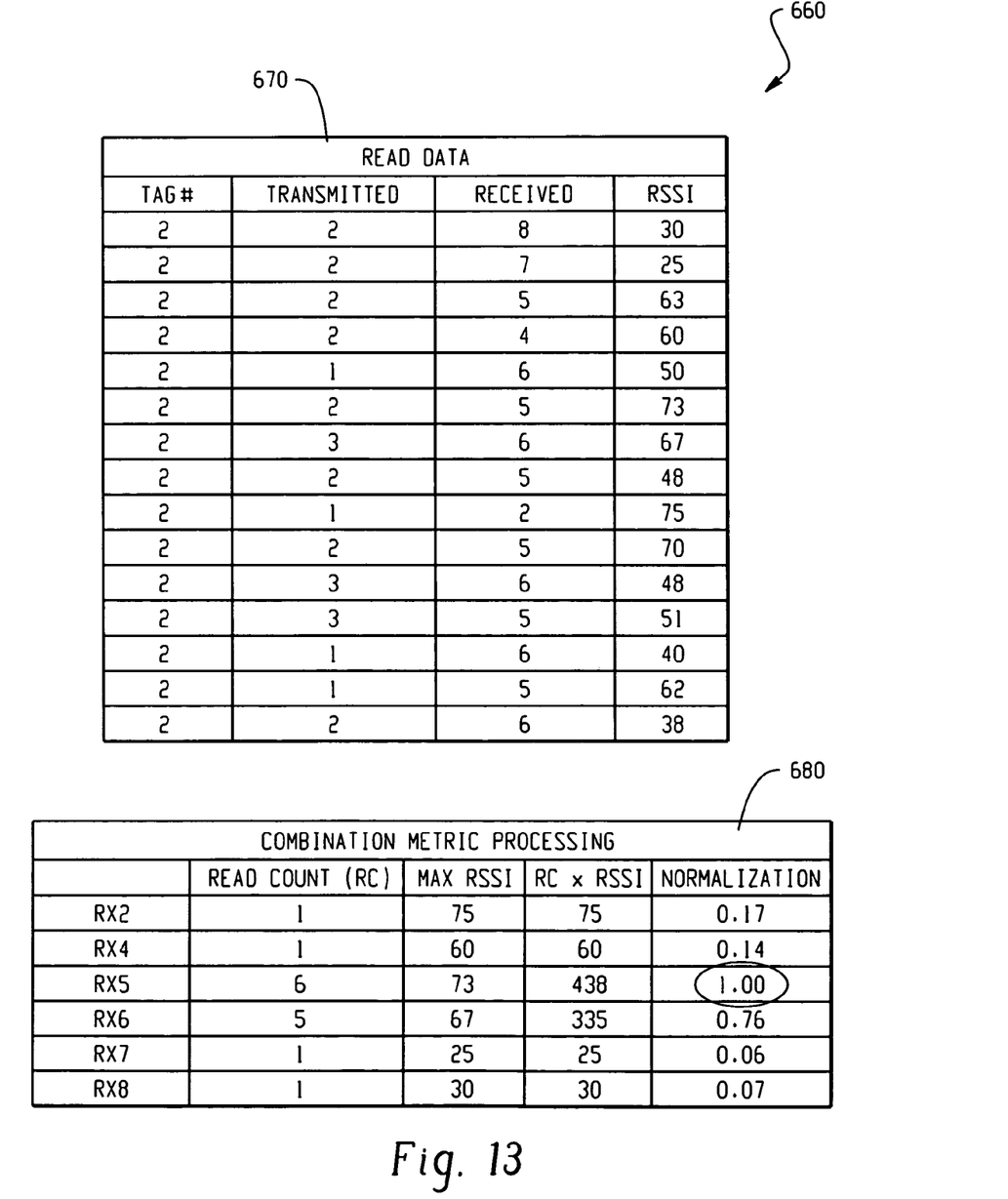
Figure 14:
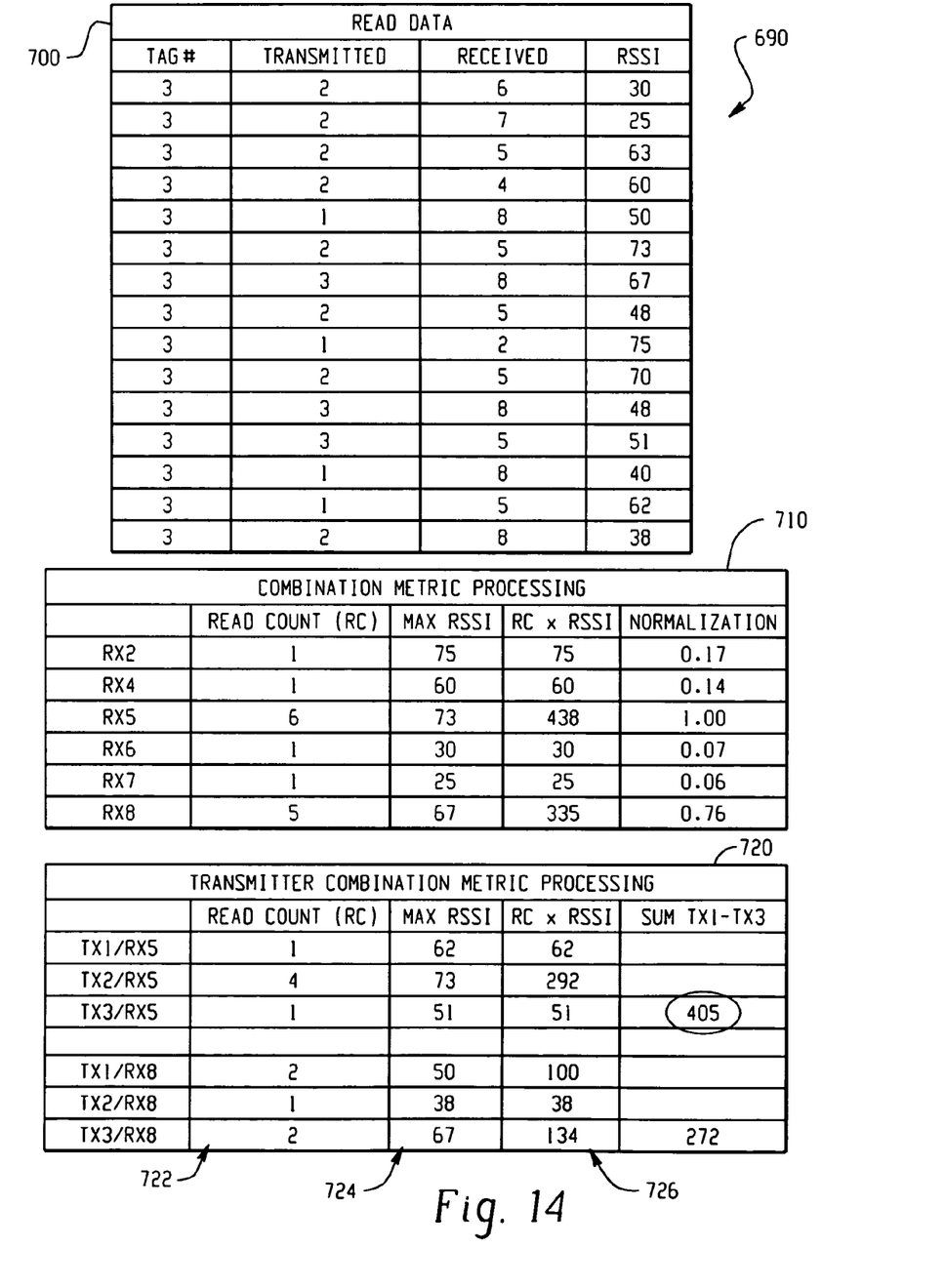

FIGS. 12-14 illustrate examples of how the location of an RFID tag may be approximated using one or more of the methods described herein. FIG. 12 illustrates a sample set of tag read data 640 from an RFID system that includes at least three transmitters and at least three receivers. The tag read data 640 indicates the tag number from which an RFID signal has been received, the transmitter number that initiated the signal, the receiver number that received the signal, and the signal strength value (RSSI) of the received signal. In the illustrated example, five RFID signals have been received from tag number 1.

Also illustrated in FIG. 12 is a combination metric processing chart 650 that shows an example of how combination metric data may be calculated from the tag read data 640 to identify a receiver that is closest in proximity to the RFID tag. The combination metric processing chart 650 includes a read count (RC) column 652, a maximum RSSI column 654, a combination metric (RC×RSSI) column 656, and a normalized combination metric column 658. The read count column 652 indicates the read count for each receiver (RX1-RX3). The maximum RSSI column 654 indicates the maximum RSSI value recorded for each receiver. The values in the combination metric column 656 are calculated by multiplying the read count (RC) by the maximum RSSI for each receiver (RX1-RX3). The combination metric values are then normalized in column 658 by dividing the combination metric values (column 656) by the highest combination metric, which is 360 in this example. In this example, RX3 is selected as being closest in proximity to the RFID tag because it is associated with the highest normalized value (1.00). In one example, RX3 may be selected because there is only one receiver (RX3) having a normalized value that is higher than a predetermined threshold (e.g., 0.75).

FIG. 13 illustrates another example of how combination metric data 680 may be calculated from tag read data 670 to identify a receiver that is closest in proximity to the RFID tag. In this example, the combination metric processing table 680 shows that RX5 is closest in proximity to tag number 2. Cross-referencing the data from the table 680 with the example method 510 of FIG. 11, the table 680 identifies two receivers, RX5 and RX6, with a normalized value higher than a predetermined threshold (e.g., 0.75). Also, the two receivers (RX5 and RX6) are adjacent in the RFID system. Thus, according to the method 510 of FIG. 11, the receiver (RX5) with the highest normalized value (1.0) is selected as the receiver that is closest in proximity to the RFID tag (tag 2).

FIG. 14 illustrates a third example 690 of how combination metric data 710, 720 may be calculated from tag read data 700 to identify a receiver that is closest in proximity to the RFID tag. In this example, the combination metric processing table 710 identifies two receivers, RX5 and RX8, with a normalized value higher than a predetermined threshold (e.g., 0.75). However, the two receivers (RX5 and RX8) are not adjacent in the RFID system. Thus, according to the example method 510 of FIG. 11, a transmitter combination metric is determined for each relevant receiver/transmitter combination metric, as shown in the transmitter combination metric processing table 720.

As illustrated in table 720, transmitter combination metric values 720 may be calculated by multiplying the read count (RC) 722 and the maximum RSSI 724 for each transmitter/receiver combination of the relevant receivers (RX5 and RX8) and then summing the resultant values 726 (RC×RSSI) for each receiver. For instance, the illustrated example 720 shows combination metrics (RC×RSSI) of 62, 292 and 51 for the transmitter receiver combinations TX1/RX5, TX2/RX5 and TS3/RS5, respectively. A transmitter combination metric value of 405 is calculated for RX5 by summing these three values from column 726. A transmitter combination metric value of 272 is similarly calculated for RX8. According to the example method of FIG. 11, RX5 is then selected as the receiver that is closest in proximity to the RFID tag because it has the highest transmitter combination metric value (405).

This written description uses examples to disclose the invention, including the best mode, and also to enable a person skilled in the art to make and use the invention. The patentable scope of the invention may include other examples that occur to those skilled in the art. For instance, the example methods described in FIGS. 7-11 may be performed by the BRT hub 14 shown in FIG. 1. In other examples, however, the location determination methods described herein may be performed using one or more other processors in or associated with an RFID system.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A computer-implemented method of approximating a location of a radio frequency identification (RFID) tag in an RFID system, the RFID system including a plurality of receivers that receive RF signals from the RFID tag, the method comprising:
    receiving tag read count data for two or more of the plurality of receivers, the tag read count data identifying a number of times that each of the two or more receivers has received an RF signal from the RFID tag over a period of time;
    receiving signal strength data relating to the RF signals received from the RFID tag by the two or more receivers;
    determining a combination metric for each of the two or more receivers, the combination metric being determined as a function of the tag read count data and the signal strength data; and
    comparing the combination metrics to identify one of the receivers that is closest in proximity to the RFID tag.

2. The method of claim 1, wherein the signal strength data includes received signal strength indicator (RSSI) values.

3. The method of claim 1, wherein the signal strength data identifies maximum RSSI values received by each of the two or more receivers.

4. The method of claim 3, wherein the combination metrics are calculated by multiplying the maximum RSSI values by the read count data.

5. The method of claim 1, further comprising:
    normalizing the combination metrics with respect to one of the combination metrics having a highest value;
    wherein the normalized combination metrics are compared to identify the one receiver that is closest in proximity to the RFID tag.

6. The method of claim 5, further comprising:
    comparing the normalized combination metrics with a threshold value; and
    if two or more receivers have normalized combination metrics above the threshold value, then applying additional criteria to identify the one receiver that is closest in proximity to the RFID tag from the two or more receivers having normalized combination metrics above the threshold value.

7. The method of claim 6, wherein the additional criteria includes whether the two or more receivers having normalized combination metrics above the threshold value are located adjacent to each other in the RFID system.

8. The method of claim 6, wherein the threshold value is 0.75.

9. The method of claim 7, wherein if the two or more receivers having normalized combination metrics above the threshold value are located adjacent to each other in the RFID system, then selecting a receiver having a highest normalized combination metric as the one receiver that is closest in proximity to the RFID.

10. The method of claim 6, wherein the RFID system further includes a plurality of transmitters, the RFID tag modulating signals received from the plurality of transmitters to generate the RF signals.

11. The method of claim 10, wherein the additional criteria includes a transmitter combination metric for each of the two or more receivers having normalized combination metrics above the threshold value, the transmitter combination metrics being determined as a function of the tag read count data and the signal strength data for each unique combination of the plurality of transmitters and the two or more receivers having normalized combination metrics above the threshold value.

12. The method of claim 11, wherein a receiver having a highest transmitter combination metric is selected as the one receiver that is closest in proximity to the RFID.

13. An RFID system, comprising:
    a radio frequency identification (RFID) tag;
    a plurality of receivers that receive RFID signals from the RFID tag;
    one or more processors that receive tag read count data for two or more of the plurality of receivers, the tag read count data identifying a number of times that each of the two or more receivers has received an RF signal from the RFID tag over a period of time;
    the one or more processors receiving signal strength data relating to the RF signals received from the RFID tag by the two or more receivers;
    the one or more processors determining a combination metric for each of the two or more receivers, the combination metric being determined as a function of the tag read count data and the signal strength data; and
    the one or more processors comparing the combination metrics to identify one of the receivers that is closest in proximity to the RFID tag.

14. The system of claim 13, wherein the signal strength data includes received signal strength indicator (RSSI) values.

15. The system of claim 13, wherein the signal strength data identifies maximum RSSI values received by each of the two or more receivers.

16. The system of claim 15, wherein the combination metrics are calculated by multiplying the maximum RSSI values by the read count data.

17. The system of claim 13, further comprising:
    the one or more processors normalizing the combination metrics with respect to one of the combination metrics having a highest value;
    wherein the normalized combination metrics are compared to identify the one receiver that is closest in proximity to the RFID tag.

18. The system of claim 17, further comprising:
the one or more processors comparing the normalized combination metrics with a threshold value; and
if two or more receivers have normalized combination metrics above the threshold value, then the one or more processors applying additional criteria to identify the one receiver that is closest in proximity to the RFID tag from the two or more receivers having normalized combination metrics above the threshold value.

19. The system of claim 18, wherein the additional criteria includes whether the two or more receivers having normalized combination metrics above the threshold value are located adjacent to each other in the RFID system.

20. The system of claim 18, wherein the threshold value is 0.75.

21. The system of claim 19, wherein if the two or more receivers having normalized combination metrics above the threshold value are located adjacent to each other in the RFID system, then the one or more processors selecting a receiver having a highest normalized combination metric as the one receiver that is closest in proximity to the RFID.

22. The system of claim 18, further comprising:
a plurality of transmitters that transmit carrier signals to the RFID tag;
wherein the RFID tag modulates the carrier signals to generate the RF signals.

23. The system of claim 22, wherein the additional criteria includes a transmitter combination metric for each of the two or more receivers having normalized combination metrics above the threshold value, the transmitter combination metrics being determined as a function of the tag read count data and the signal strength data for each unique combination of the plurality of transmitters and the two or more receivers having normalized combination metrics above the threshold value.

24. The system of claim 23, wherein a receiver having a highest transmitter combination metric is selected as the one receiver that is closest in proximity to the RFID.

25. An RFID system, comprising:
a radio frequency identification (RFID) tag;
a plurality of receivers that receive RFID signals from the RFID tag;
means for receiving tag read count data for two or more of the plurality of receivers, the tag read count data identifying a number of times that each of the two or more receivers has received an RF signal from the RFID tag over a period of time;
means for receiving signal strength data relating to the RF signals received from the RFID tag by the two or more receivers;
means for determining a combination metric for each of the two or more receivers, the combination metric being determined as a function of the tag read count data and the signal strength data; and
means for comparing the combination metrics to identify one of the receivers that is closest in proximity to the RFID tag.

26. A method for remotely monitoring compliance with an advertising program without human intervention by determining the presence of a plurality of promotional displays each at a predetermined location at a plurality of facilities, comprising:
associating RF means with a plurality of promotional displays each to be displayed for advertising purposes for wirelessly sending data about the displays from the displays;
locating RF receiving means remotely from the displays for receiving the display data;
determining location data for each of the plurality of promotional displays using a computer-implemented method that includes the steps of:
receiving tag read count data for the RF receiving means, the tag read count data identifying a number of times that each of the RF receiving means has received display data from a particular RF means over a period of time;
receiving signal strength data relating to the display data received from the RF means by the RF receiver means;
determining a combination metric for each of the RF receiver means, the combination metric being determined as a function of the tag read count data and the signal strength data; and
comparing the combination metrics to identify which of the RF receiver means is closest in proximity to each of the RF means;
analyzing the display data and the location data to determine the identity of the displays and whether the displays are timely and properly located at the various facilities and thereby in compliance with the advertising program.

27. An RF system for remotely monitoring, without human intervention, compliance with an advertising program that includes displays to be located at a plurality of different facilities by determining the presence of one or more advertising displays at a plurality of predetermined locations, with at least one display at each facility in the program, comprising:
a tag associated with each advertising display, the display being displayed for advertising purposes, and the tag being adapted for RF communication;
at least one RF reader at each facility for receiving tag data from each tag within range of the reader, the receiving tag data indicating the identity of and presence of the tag and its corresponding display in a particular one of the predetermined locations at a facility in the program;
one or more processors that receive tag read count data for the RF readers, the tag read count data identifying a number of times that each of the RF readers has received an RF signal from a particular tag over a period of time;
the one or more processors receiving signal strength data relating to the RF signals;
the one or more processors determining a combination metric for each of the RF readers, the combination metric being determined as a function of the tag read count data and the signal strength data;
the one or more processors comparing the combination metrics to determine location data that identifies which of the RF readers is closest in proximity to each of the tags;
the one or more processors receiving tag data from each tag at the facility; and
the one or more processors analyzing the tag data and the location data to determine whether each display is timely and properly located in each facility and thereby which advertising displays and facilities are in compliance with the advertising program.

* * * * *